3,778,423
METHOD FOR REDUCING POLYMER DEPOSIT IN POLYMERIZATION OF VINYL CHLORIDE
William M. Reiter, Mentor, Ohio, assignor to Universal PVC Resins, Inc., Plainesville, Ohio
No Drawing. Filed June 28, 1971, Ser. No. 157,752
Int. Cl. C08f 3/22
U.S. Cl. 260—92.8 W          4 Claims

ABSTRACT OF THE DISCLOSURE

In the polymerization of vinyl chloride in the presence of an oil-soluble polymerization initiator, adhesion of vinyl chloride polymer to the interior surface of the polymerization vessel is substantially reduced by coating the surface, prior to polymerization, with a free radical inhibitor.

BACKGROUND OF THE INVENTION

When vinyl chloride is polymerized in a closed reactor in the presence of an oil-soluble initiator (i.e. an initiator soluble in the vinyl chloride monomer), as in suspension polymerization, vinyl chloride polymer is undesirably deposited on the interior surface of the reactor. To remove this polymer deposit, the reactor is normally cleaned after every batch with high pressure water, and periodically, such as after about every 10 batches, the entire interior surface is hand scraped. These cleaning operations, which are time consuming and expensive, have been necessary because carry-over of the polymer deposit into the product of succeeding batches causes undesirable fish-eyes in the final product. Fish-eyes are gelatinous particles which do not readily absorb plasticizer and consequently appear as discreet gel particles in the finished produced.

It is an object of this invention to provide a method of inhibiting deposit of vinyl chloride polymer on the interior surface of the reactor.

SUMMARY OF THE INVENTION

This invention provides an improved process for polymerizing vinyl chloride in a closed reactor in the presence of an oil-soluble catalyst. The improvement comprises inhibiting deposit of vinyl chloride polymer on the interior surface of the reactor by coating the interior surface of the reactor with a free radical inhibitor. The surface is coated with the inhibitor prior to introducing the polymerization mixture into the reactor.

The inhibitor can be applied to the surface of the reactor in accordance with any convenient method. For example, the inhibitor can be sprayed onto the surface or wiped on with a cloth or other application. The inhibitor can be diluted with an inert solvent, such as toluene, if desired; but preferably the inhibitor is applied undiluted. Normally about 10 to 20 grams of inhibitor are required to coat each square meter of surface; but since the inhibitor may be diluted or applied more liberally if desired, from about 1 to about 50 grams of inhibitor per square meter can be employed in accordance with this invention.

Free radical inhibitors are a well-known class of compounds. They normally cause an induction period in a free radical initiated polymerization when added directly to the reaction mixture. Free radical inhibitors are typically polar organic (usually aromatic) compounds, such as alphamethylstyrene, acetophenone, phenol, cumylphenol, bisphenol A, and tar acids. In addition to these compounds, suitable free radical inhibitors include compounds which are known short-stopping agents in vinyl chloride polymerizations, such as thioalcohols; amines, as for example diphenylamine, triphenylamine, triethylamine and ethylenediamine tetraacetic acid; conjugated trienic terpenes; alpha-alkyl-alpha,beta-unsaturated ketones such as methylisopropenyl ketone, 4-ethoxy-3-methyl-3-butene-2-one, 3-methyl-4-phenyl-3-butene-2-one, 3-methyl-4-phenyl-3-pentene-2-one, and mixtures thereof; vinyl pyridene, in which any substituents are alkyl ring substituents, such as 2-vinyl pyridene, 3-vinyl pyridene and 4-vinyl pyridene, 2-methyl-5-vinyl pyridene, 5-ethyl-2-vinyl pyridene, 2,4-dimethyl-6-vinyl pyridene and mixtures thereof; conjugated diolefin hydrocarbons such as 1,3-butadiene, isoprene, 2,3-dimethyl butadiene-1,3, cyclopentadiene, 1-vinyl cyclohexane; chloroprene; ring unsaturated cyclomonoolefins, such as cyclopentene, cyclohexene, cycloheptene, or cyclooctene; styrene, nuclear substituted chlorostyrenes, alpha-alkyl-substituted styrenes and alpha-alkyl substituted nuclear chloro-substituted styrenes, such as monochlorostyrene, 3,4-dichlorostyrene, pentachlorostyrene, alpha-methylstyrene, alpha-methyl 3,4-dichlorostyrene and mixtures thereof; polyunsaturated monocarboxylic acids, such as sorbic acid, furyl-acrylic acid, linoleic acid, linolenic acid, eleostearic acid, soya-bean oil fatty acids, beta-vinyl acrylic acid, geranic acid, dihydrogeranic acid and mixtures thereof; unsaturated aldehydes having ethylenic unsaturation such as cinnamaldehyde, acrolein, methacrolein, crotonaldehyde, tiglic aldehyde, citral, citronellal, and mixtures thereof; acrylonitrile and methacrylonitrile; and aromatic nitro compounds, such as nitrobenzene and nitronaphthalene; and quinones, such as hydroquinone and naphthoquinone.

The inhibitor is preferably substantially insoluble in water.

Especially good results are obtained using alpha-methylstyrene as the free radical inhibitor. Derivatives of alpha-methylstyrene containing lower alkyl or halogen substituents on the aromatic nucleus also give good results.

This invention is applicable not only to homopolymerization of vinyl chloride, but also to copolymerization of vinyl chloride with other ethylenically unsaturated monomers. Suitable comonomers are known to those skilled in the art and include, for example, vinylidene chloride; vinyl esters, such as vinyl acetate; esters of acrylic and methacrylic acid; vinyl ethers, such as vinyl ethyl ether; allyl compounds, such as allyl acetate, allyl chloride and diallyl phthalate; and unsaturated hydrocarbons, such as ethylene, propylene, and butadiene. The copolymer produced preferably contains at least 50%, more preferably at least 80%, by weight of vinyl chloride polymerized therein.

Suitable oil-soluble polymerization initiators are also well known to those skilled in the art and include, for example, the conventional oil-soluble organic peroxide, such as lauroyl peroxide, benzoyl peroxide, diisopropyl peroxydicarbonate, and the like as well as the azo compounds, such as diazo butyronitrile. The polymerization initiator may be added initially, intermittently, or continuously throughout the polymerization.

Vinyl chloride is conventionally polymerized at temperatures between about 40 and about 70° C. and at pressures of about 70 to about 150 p.s.i.g.

This invention is particularly applicable to suspension polymerization of vinyl chloride. In suspension polymerization, the vinyl chloride and comonomers (if any) are maintained as droplets in an aqueous medium by the use of suspending agents. The ratio of water to monomer may range from about 1:1 to about 3:1, and typically is from about 1.2:1 to about 1.5 to 1. Suitable suspending agents are known in the art and include polyvinyl alcohol, gelatin, and methyl cellulose. As is conventional, the suspending agents are employed in an amount ranging between about 200 and 1000 p.p.m., based on the weight of the monomer charge. The polymerization temperature is normally between about 40 and 70° C. and the pressure, which is generally autogenously developed, is usually between 70 and 150 p.s.i.g.

Other conventional additives, such as buffers, emulsifiers, and molecular weight regulators, can also be added to the polymerization mixture.

The following example further illustrates the invention. All parts are by weight except where otherwise indicated.

EXAMPLE

The interior surface of a 5000 gallon glass-lined reactor equipped with an agitator was coated with alpha-methylstyrene. The reactor was then charged with:

| | Parts |
|---|---|
| Demineralized water | 20,825 |
| Vinyl chloride | 18,048 |
| Polyvinyl alcohol | 10 |
| Disodium phosphate (buffer) | 6 |
| Diisopropyl peroxydicarbonate | 8.75 |

Polymerization was carried out at 56° C. until the pressure in the reactor dropped from the initial pressure of 120 p.s.i.g. to 90 p.s.i.g. (between 7 and 8 hours), whereupon the reactor was vented and drained. In accordance with conventional practice, the interior surface of the reactor was flushed with low pressure water during transfer of the batch.

This procedure was repeated in successive production runs over an extended period of time. As a result of coating the interior surface of the reactor with alpha-methylstyrene, the reactor required cleaning with high pressure water on an average of only once every 5 batches, and as many as 12 batches could be processed without any interim cleaning. The interior surface of the reactor was recoated with alpha-methylstyrene after each cleaning with high pressure water. The amount of alpha-methylstyrene used to coat the surface each time ranged from about one pint to about one quart (equivalent to about 10 to 20 grams per square meter). The alpha-methylstyrene was usually sprayed onto the surface, but wiping the alpha-methylstyrene onto the surface with a cloth was equally effective. As a result of following this procedure over the extended period of time, the reactor required manual cleaning on an average of only once every 25 batches.

Substantially equivalent results were obtained by coating the interior surface of a stainless steel reactor with alpha-methylstyrene.

In comparison, production of polyvinyl chloride under comparable conditions in a reactor not coated with a polymerization inhibitor required cleaning of the reactor with high pressure water after each batch and manual cleaning on an average of once every 10 batches to produce equivalent results.

I claim:

1. In a process for polymerizing vinyl chloride in suspension in an aqueous medium in a closed reactor in the presence of suspending agent and an oil-soluble polymerization initiator, the improvement of inhibiting deposit of vinyl chloride polymer on the interior surface of the reactor by coating the interior surface of the reactor, prior to introduction of said vinyl chloride into said reactor, with a free-radical inhibitor selected from the group consisting of alpha-methylstyrene and nuclear-substituted lower alkyl and halogen derivatives thereof.

2. The process of claim 1 wherein the surface is coated with from 1 to 50 grams of the inhibitor per square meter of surface.

3. The process of claim 1 wherein the inhibitor is alpha-methylstyrene.

4. The process of claim 3 wherein the surface is coated with from 1 to 50 grams of the inhibitor per square meter of surface.

References Cited

UNITED STATES PATENTS

| 3,515,709 | 6/1970 | Nelson et al. | 260—92.8 W |
| 3,647,773 | 3/1972 | Keitaro | 260—92.8 W |

JOSEPH L. SCHOFER, Primary Examiner

R. S. BENJAMIN, Assistant Examiner

U.S. Cl. X.R.

260—86.3, 87.1, 87.5, 87.7